United States Patent Office 3,808,327
Patented Apr. 30, 1974

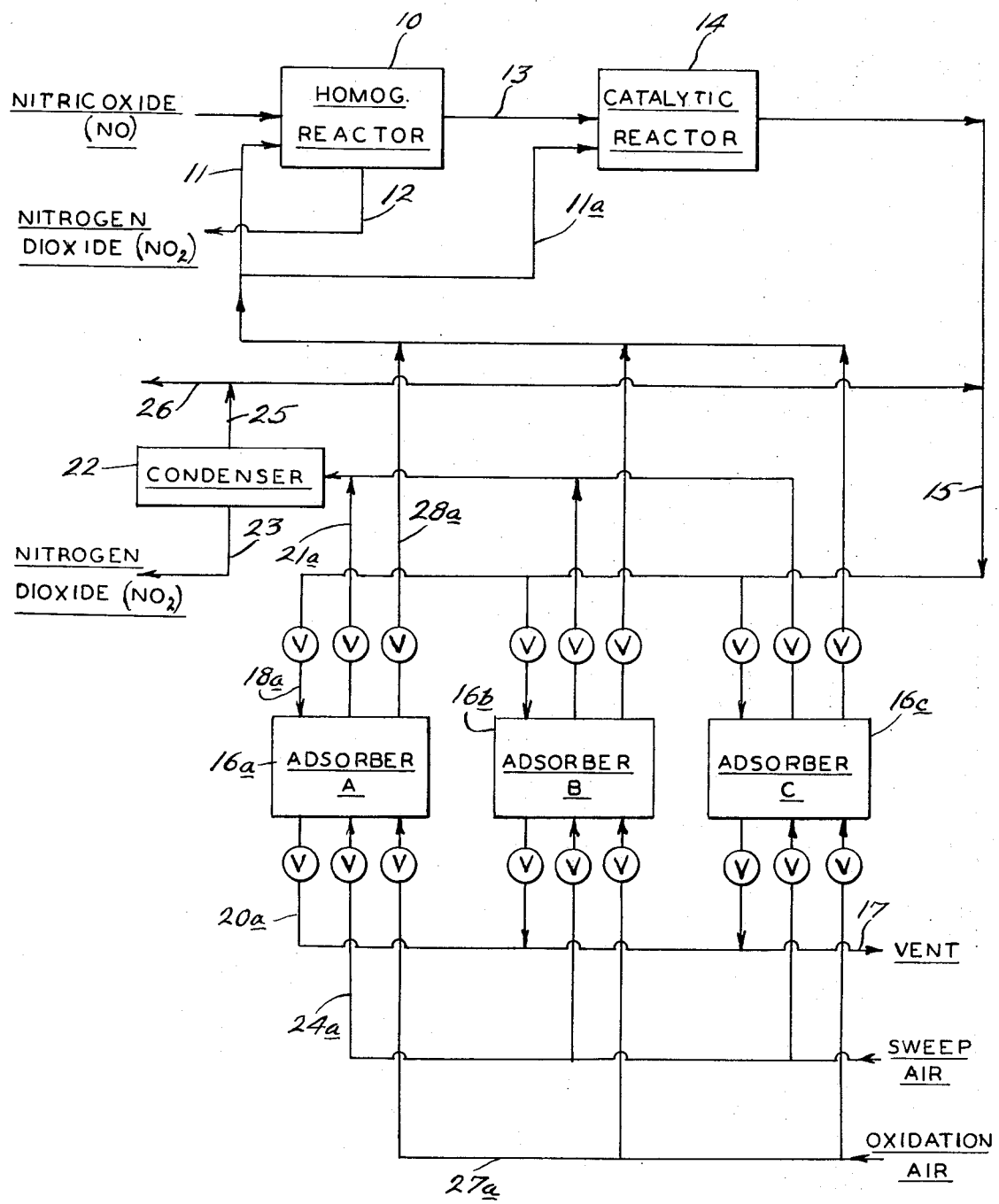

3,808,327
METHOD FOR CONVERTING NITRIC OXIDE TO NITROGEN DIOXIDE AND RECOVERY THEREOF
Edward S. Roberts, 214—05 33rd Ave.,
Bayside, N.Y. 11361
Filed Feb. 3, 1972, Ser. No. 223,346
Int. Cl. C01b 21/36
U.S. Cl. 423—402
8 Claims

ABSTRACT OF THE DISCLOSURE

Nitric oxide, NO, is oxidized with molecular oxygen, to form nitrogen dioxide, $NO_2$, and the $NO_2$ is recovered from the product gases by selective adsorption on a solid adsorbent. The bulk of the $NO_2$ is removed from the adsorbent, as by heating, and the oxygen-containing gas, e.g. air, which provides the molecular oxygen used in the oxidation of NO, is then passed, prior to such use, through the adsorbent, during which passage it removes residual gases from the adsorbent. In preferred operation, the adsorbent goes through a cycle in which, first the $NO_2$ is adsorbed on the adsorbent, second, the bulk of the $NO_2$ is removed by heating the adsorbent and passing a relatively small amount of a first air stream, referred to herein as sweep air, through the adsorbent, and, third, a relatively large amount of a second air stream, referred to herein as oxidation air, is passed through the adsorbent, removing residual gases, after which it is used, containing the residual gases, as the oxidizing agent in the oxidation of NO. Preferably, $NO_2$ and sweep air from the second step are passed through a condenser to condense $NO_2$ and the noncondensibles are reintroduced into the adsorbent during the first stage of the adsorbent cycle.

---

This invention relates to a method of converting nitric oxide to nitrogen dioxide. More particularly, this invention relates to a method for converting either nitric oxide or nitric oxide contained in admixture with other gases to nitrogen dioxide and recovering the nitrogen dioxide therefrom.

2,6-naphthalene dicarboxylic acid and other naphthalene dicarboxylic acids are known starting materials in the preparation of polymers for the formation of fibers and films. One method that has been proposed for the preparation of 2,6-naphthalene dicarboxylic acid involves the oxidation of 2,6-dimethylnaphthalene with nitrogen dioxide. In the course of this reaction, the nitrogen dioxide is reduced to nitric oxide. While such an oxidation process using nitrogen dioxide is of value to prepare naphthalene dicarboxylic acids, it would be desirable to recover the nitric oxide produced in the process and economically convert it to nitrogen dioxide which may then be reused in the oxidation process.

In addition to the preparation of naphthalene dicarboxylic acids by the oxidation of 2,6-dimethylnaphthalene with nitrogen dioxide, other valuable materials have been prepared by oxidation with nitrogen dioxide. For example, xylene has been oxidized to phthalic acid, pseudocumene has been oxidized to trimellitic acid, acenaphthene has been oxidized to the corresponding quinone, and anthracene has been oxidized to anthraquinone.

Heretofore, several methods have been proposed for converting nitric oxide to nitrogen dioxide. According to one method, a mixture of air and from 1 to 3 percent nitric oxide is passed through a large chamber to convert the nitric oxide to nitrogen dioxide. The nitrogen dioxide is then dissolved in water to form a dilute solution of nitric acid.

In another method, a concentrated nitrogen dioxide product is obtained from a gaseous mixture containing only a few percent of nitric oxide by the use of oxygen. This method includes the steps of cooling the nitric-oxide containing gaseous mixture and drying the mixture by passing it through or over a solid adsorbent. The dry gas mixture is then contacted with a catalyst mass to oxidize the nitric oxide to nitrogen dioxide by means of the oxygen contained in the gas mixture. The dry gas mixture is then passed into contact with particles of a solid adsorbent such as silica gel which has the property of adsorbing the nitrogen dioxide. The nitrogen dioxide is then desorbed by heating and subsequently recovered.

The latter described prior art process for the oxidation of nitric oxide to nitrogen dioxide has an inherent disadvantage in that process limitations preclude the quantitative conversion of the nitric oxide to nitrogen dioxide and furthermore, due to the exothermic heat of reaction, the conversion has been limited to gaseous mixtures containing only relatively small amounts of nitric oxide, i.e., less than about 20 percent.

A method has now been found whereby nitric oxide can be essentially quantitatively converted to nitrogen dioxide in a process where the conversion to nitrogen dioxide and recovery of the latter from the product gases are efficiently integrated in a novel fashion.

According to the present invention, nitric oxide or nitric oxide contained in admixture with other gaseous materials in substantial amounts (i.e., greater than 20 percent), is converted to nitrogen dioxide by a unique combination of process steps.

If the nitric oxide is contained in admixture with other gases, the mixture is first washed with an aqueous alkaline solution to remove any acidic contained therein such as HCl or $CO_2$. The alkaline solution, which can be an aqueous solution of an alkali metal hydroxide including ammonium hydroxide or carbonate or an alkaline earth hydroxide, has a concentration of about 5 to 25 percent by weight, preferably 10 to 15 percent by weight. Such concentrations can be used if desired. It is preferable to use an alkali metal hydroxide solution and most preferable to use an aqueous solution of sodium hydroxide or potassium hydroxide.

The gaseous mixture (which is essentially nitric oxide and water vapor) emanating from the alkaline wash is then washed with water to remove any entrained alkaline material. This water wash also serves to cool the gas mixture to ambient temperatures or below.

The nitric oxide is then passed through a bed of a solid adsorbent having a preferential adsorptability toward water. In such a manner, there is produced a dry gas which is essentially nitric oxide. It is essential that any water vapor contained in the gaseous mixture be removed therefrom prior to subsequent process steps. If this water is not removed, it will react with the nitrogen dioxide and substantially reduce the yield of nitrogen dioxide. Suitable solid adsorbents which can be used to remove the water include silica gel, molecular sieves, etc.

Obviously if pure nitric oxide is used as a starting material in the instant process, the purification pretreatments described above need not be employed. Nevertheless, it is preferred in the instant invention to pass the nitric oxide over a solid adsorbent as a precaution against the possibility of any water vapor contained therein reacting with the desired nitrogen dioxide product.

The dried nitric oxide is passed at a pressure ranging from about atmospheric up to about 1000 p.s.i. or greater, preferably at a pressure ranging between about 150–200 p.s.i., to a primary reactor. Into this primary reactor, there is introduced a free oxygen containing gas stream as more fully defined hereinafter which reacts with the nitric oxide to form nitrogen dioxide. The temperature in the reactor is maintained at between about 0° F., preferably between 60° F., and 150° F. and most preferably between 140° F. and 150° F. The preferred temperature limitation of 150° F. is imposed in order that the conversion of nitric oxide to nitrogen dioxide be maximized. If this temperature is exceeded, any $NO_2$ produced may be decomposed to nitric oxide and oxygen in accordance with the reversible reaction, $2NO+O_2 \rightarrow 2NO_2$. In this primary reactor, the reaction conditions of pressure and temperature are so adjusted that the reactants are in the vapor phase and the nitrogen dioxide produced will be at least partially liquefied for ease of removal from the reactor. The conversion of nitric oxide to nitrogen dioxide in this primary reactor is of the order of magnitude of 95–96%.

The unreacted nitric oxide evolving from the primary reactor is passed to a secondary reactor containing a catalyst mass which will accelerate the oxidation of the nitric oxide to nitrogen dioxide. This catalyst can be silica gel, activated carbon, or titania gel. A free oxygen-containing gas stream is also introduced into the secondary reactor. The conditions of temperature and pressure in the secondary reactor are maintained such that the nitrogen dioxide remains in the vapor phase and does not liquefy. The efficiency of the secondary reactor is about 95%; the overall efficiency of the instant process for the conversion of nitric oxide to nitrogen dioxide is in excess of 99%.

The nitrogen dioxide produced in the secondary reactor by the interaction of the nitric oxide and oxygen along with other gaseous materials is passed to an adsorber containing a bed of adsorbent which will preferentially adsorb the nitrogen dioxide contained in the gaseous mixture. Suitable adsorbents include silica gel, titania gel, etc. The nitrogen dioxide is recovered from the adsorbent by simply heating the bed of adsorbent and recovering gaseous nitrogen dioxide; this may be, but is not necessarily, supplemented by the passage of a small amount of hot air (sweep air) over the bed of adsorbent. In either event, there will always remain on the adsorbent a small amount of residual nitrogen dioxide. This residual nitrogen dioxide could, of course, be removed by extreme heating, but this is undesirable, however, for economic reasons and because of inordinate dilution or loss of the desired product. The complete removal of the nitrogen dioxide is, however, extremely desirable, since such removal places the adsorbent in condition to adsorb further quantities of nitrogen dioxide from the secondary reactor than would otherwise be possible if the residual nitrogen dioxide were not removed.

According to the instant invention, substantially complete removal of the residual adsorbed nitrogen dioxide is accomplished without any undue loss thereof. Following removal of the bulk of the $NO_2$ from the adsorbent, air which has preferably been previously dried is passed over the adsorbent and desorbs the residual nitrogen dioxide and also serves to cool the bed of adsorbent. The air containing the desorbed residual nitrogen dioxide is then used as the oxidizing agent in the primary and secondary reactors, or it can be used in conjunction with an outside source of a free oxygen containing gas stream as the oxidizing agent in the primary and secondary reactors.

This invention will be further understood by reference to the attached drawing which is a schematic flow diagram adapted for practicing one embodiment of the process of the instant invention.

A nitric oxide containing gaseous mixture obtained from a source (not shown) and having a composition as follows:

| Gas: | Mol percent (dry basis) |
|---|---|
| NO | 92.2 |
| $N_2O$ | 1.1 |
| $N_2$ | 0.7 |
| $CO_2$ | 4.0 |
| HCl | 2.0 | is deacidulated and dried by means not shown to obtain a gas which is essentially nitric oxide and will be so referred to hereinafter. The nitric oxide is placed under a pressure of 170 p.s.i.a. at a temperature of 140° F. The compressed nitric oxide is passed to primary homogeneous reactor 10. Oxidation air is introduced into the primary reactor through conduit 11. Liquefied nitrogen dioxide is removed from the primary reactor through conduit 12. Unreacted nitric oxide and other gases are passed from the primary reactor through conduit 13 to secondary catalytic reactor 14. The secondary reactor contains a catalyst bed of silica gel. Oxidation air is introduced into the secondary reactor through conduit 11a. The temperature in the secondary reactor is maintained at 140° F. while the pressure therein is maintained at 120 p.s.i.a. The gases from secondary reactor 14 are passed through conduit 15 to adsorber 16a in a bank of adsorbers 16a, 16b and 16c, each containing a bed of silica gel which preferentially adsorbs the nitrogen dioxide contained in the gaseous mixture. Small amounts of unreacted nitric oxide and other gases are vented through conduit 20a and conduit 17.

When the bed of silica gel in adsorber 16a becomes saturated with $NO_2$, the flow of gas through line 15 into adsorber 16a and through line 20a to vent are stopped. To effect primary desorption, the adsorbent in adsorber 16a is then heated by means not shown, to a temperature of 392° F., for example, to desorb $NO_2$ which is removed through line 21a to a condenser 22, in which the $NO_2$ vapor is condensed to produce liquid $NO_2$ which is removed through line 23 as a product of the process. Sweep air is introduced through line 24a to remove additional $NO_2$ from the adsorbent in the primary desorption and carry the removed gas through condenser 22. $NO_2$ is condensed from the gases and removed through line 23, and noncondensibles are passed through lines 25 and 15 back into the adsorption system. A portion of the noncondensibles can be removed through line 26 to prevent noncondensibles from building up in the system. The noncondensibles thus removed can be recycled, at least in part, to the oxidation system.

After a predetermined interval, passage of sweep air into the adsorber 16a through line 24a and passage of gases from the adsorber 16a through line 21a are stopped, and passage of oxidation air through line 27a into adsorber 16a is begun to effect residual absorption. The oxidation air removes residual gases including $NO_2$ from the adsorbent and passes through lines 28a, 11 and 11a into the oxidation reactors 10 and 14.

After a predetermined interval, the passage of oxidation air through the adsorber 16a is stopped, and the adsorbent therein is cooled, e.g., to below 103° F., prior to beginning again the passage of oxidation product through line 15 into adsorber 16a.

Each of the adsorbers 16b and 16c goes through a similar cycle of operations to that described for adsorber 16a, each adsorber being in a different portion of the cycle at a given moment. The flow of gas through line 15 is switched from one adsorber to the next at the appropriate time, and the flows of sweep air and of oxidation air are similarly switched from one adsorber to the next at the appropriate time, so that the flows of the various gas streams are continuous.

In the primary desorption, heating alone is used, in one embodiment, without sweep air, to remove $NO_2$ through line 21a and the corresponding lines of the other adsorbers.

Although the operation has been illustrated by a battery of three adsorbers, it may be desirable, for operational efficiency, and because of the varying lengths of time which may be preferred for various portions of the adsorption cycle, to provide more than three adsorbers. For example, there may be eight adsorbers, each being at a given moment in a different stage of an overall cycle of adsorber operation. Four of these adsorbers may, for example, be in various stages of the adsorption portion of the cycle, at the same time that a fifth and sixth adsorber are in the desorption and sweep air (primary desorption) portion of the cycle, a seventh adsorber is in the oxidation air (residual desorption) portion of the cycle, and the eighth is in the cooling stage prior to entering again the adsorption portion of the cycle. In such operation, the desorption and sweep air operation may be carried out with dried air being passed in series through the sixth and then the fifth adsorber, and displaced $NO_2$ withdrawn from the fifth adsorber. Also, the oxidation air and cooling portions of the cycle may be carried out by passing oxidation air through the eighth adsorber while the latter is cooling and then through the seventh adsorber, after which it is introduced into the oxidation reactors.

The arrangement of adsorbers for the above or other suitable cycles of operation, with appropriate piping and valves, can be performed by a person skilled in the art, in the light of the disclosure herein.

Where $NO_2$ or nitrogen dioxide is referred to herein it is to be understood as including the molecular form $N_2O_4$, when the temperature is such that the compound exists in that form.

The invention claimed is:

1. Method for oxidizing NO to $NO_2$ which comprises:
   (a) contacting NO with molecular oxygen in a primary noncatalytic reaction zone and then a secondary catalytic reactor to produce $NO_2$, $NO_2$ being removed as product from the primary reaction zone,
   (b) passing the product gases from the catalytic reactor into an absorption zone wherein $NO_2$ is adsorbed from the product gases on a solid adsorbent,
   (c) periodically discontinuing passage of $NO_2$ into the adsorption zone,
   (d) removing bulk of the $NO_2$ from the adsorbent,
   (e) passing air into the adsorption zone to remove residual $NO_2$ from the adsorbent, and
   (f) passing said air containing removed residual $NO_2$ into said primary reaction zone to react molecular oxygen in the air with NO.

2. Method in accordance with claim 1 wherein the temperature in the primary and secondary reactors is in the range of 60° F. and 150° F.

3. Method in accordance with claim 1 wherein the pressure in the primary reactor is in the range of 150 p.s.i.a. to 200 p.s.i.a.

4. Method in accordance with claim 1 wherein the pressure in the secondary reactor is less than 150 p.s.i.a. and the catalyst contained in the secondary reactor is selected from the group consisting of silica gel, activated carbon, and titania gel.

5. Method in accordance with claim 1 wherein the temperature in the primary and secondary reactors is in the range of 140° F. to 150° F.

6. Method in accordance with claim 3 wherein the pressure in the primary reactor is in the range of 150 p.s.i.a. to 200 p.s.i.a.

7. Method in accordance with claim 3 wherein the pressure in the secondary reactor is less than 150 p.s.i.a. and the catalyst contained in the secondary reactor is selected from the group consisting of silica gel, activated carbon, and titania gel.

8. Method for oxidizing NO to $NO_2$ which comprises:
   (a) reacting NO with molecular oxygen in a primary noncatalytic reactor and then in a secondary catalytic reaction zone to produce $NO_2$, $NO_2$ being removed as product from the primary reaction zone,
   (b) passing the product gases from the secondary reaction zone into an adsorption zone wherein $NO_2$ is adsorbed from the product gases on a solid adsorbent,
   (c) periodically discontinuing passage of $NO_2$ into the adsorption zone,
   (d) heating the adsorbent and introducing a first air stream into the adsorbent to remove the bulk of the $NO_2$ therefrom,
   (e) withdrawing a gas stream containing $NO_2$ and said first air stream from the adsorbent,
   (f) condensing $NO_2$ from said gas stream,
   (g) passing a second air stream into the adsorption zone to remove residual $NO_2$ from the adsorbent and,
   (h) passing said second air stream containing removed residual $NO_2$ into said primary reaction zone to react molecular oxygen in said second stream with NO.

References Cited

UNITED STATES PATENTS

| | | | |
|---|---|---|---|
| 3,393,047 | 7/1968 | Steinmetz-Schmaltz | 423—402 |
| 2,568,396 | 9/1951 | James | 423—400 |
| 2,674,338 | 4/1954 | Lindsay et al. | 423—239 |
| 2,578,674 | 12/1951 | Daniels et al. | 423—402 |
| 2,800,392 | 7/1957 | Pike | 423—402 |

GEORGE O. PETERS, Primary Examiner

U.S. Cl. X.R.

55—68; 423—239